Oct. 24, 1950     A. GOLDFARB     2,527,094
ILLUSION DEVICE
Filed March 24, 1950
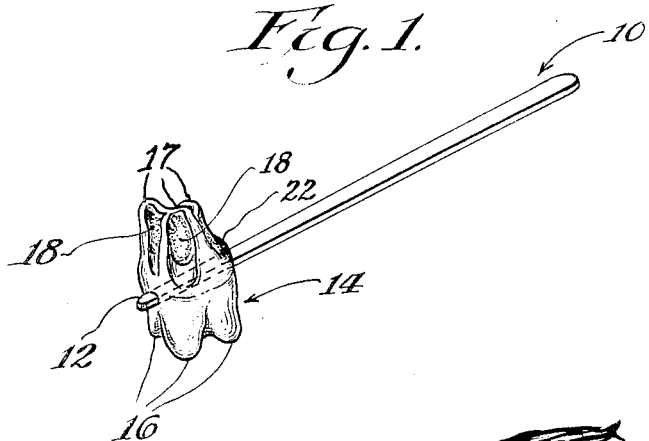
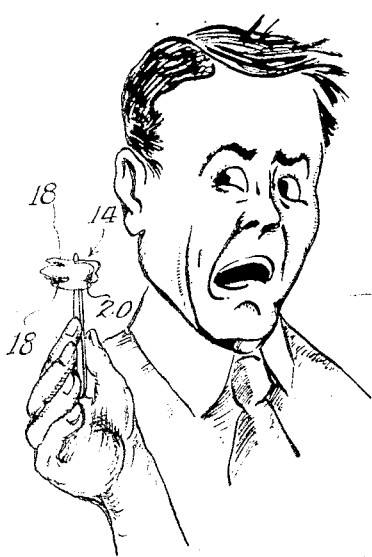
Inventor
Adolph Goldfarb
By Max Richard Kraus
Atty.

Patented Oct. 24, 1950

2,527,094

UNITED STATES PATENT OFFICE 2,527,094

ILLUSION DEVICE

Adolph Goldfarb, Chicago, Ill., assignor to Max Richard Kraus, Chicago, Ill., as trustee Application March 24, 1950, Serial No. 151,630

1 Claim. (Cl. 272—8)

This invention relates to an illusion device.

One of the objects of this invention is to provide a device consisting of an artificial tooth member and a tooth-pick member used jointly, as a means to amuse, scare or horrify others.

This device may be used in such a manner as to provide a realistic feeling that the person's natural tooth is being withdrawn or extracted from the mouth by the conventional toothpick. This act may be performed with this device at dinner tables and at other gatherings where a number of people are assembled, and by following certain hand gyrations and using appropriate facial expressions the observers would be led to believe it is a natural situation.

In the drawings:

Fig. 1 is a perspective view of my device.

Fig. 2 is a view showing same when in the mouth.

Fig. 3 is a view showing same as when removed from the mouth.

The device comprises a member 10 formed in the shape of a toothpick and to the narrow or pick end 12 there is permanently secured a simulated tooth 14 which has the usual crown portion 16 and roots 17. The roots are colored red as at 18 to simulate blood. Certain portions of the tooth, such as at 20 and 22, may be colored black to simulate decay or discoloration of the tooth.

To practice the invention, the present device is inserted in the mouth when unobserved, with the greater portion of the toothpick extending exteriorly of the mouth. The exposed end of the toothpick is grasped by the hand in the conventional manner and with the full attention of the audience directed toward him, the participant moves the toothpick through various motions as though he was picking at his tooth and with suitable various facial expressions of suspense, pain and agony he proceeds to play the role of a person having something wrong with his natural tooth. Finally in the last stage of play, he pulls the tooth out of his mouth attached to the end of the toothpick. With the roots of the tooth as though bleeding and portions of the tooth discolored and decayed, the unexpected sight to the observers is realistic and evokes considerable surprise and anxiety and one affording a high degree of entertainment particularly when subsequently apprised of the truth.

While I have shown the toothpick permanently secured to the tooth, it can be readily understood that same may be separate and that with the tooth previously placed in the mouth, the toothpick is inserted to engage same so that both may be simultaneously withdrawn from the mouth.

It will be understood that various changes may be made without departing from the spirit and scope of the appended claim.

I claim:

An illusion device comprising a simulated toothpick and a simulated tooth mounted at one end thereof with its axis perpendicular to the axis of the toothpick, said tooth simulating the appearance of a natural tooth immediately after extraction, the tooth being adapted to be retained in the mouth and then lifted out by said toothpick to create the illusion of extracting the tooth from the mouth with said toothpick.

ADOLPH GOLDFARB.

REFERENCES CITED

The following references are of record in the file of this patent:

UNITED STATES PATENTS

| Number | Name | Date |
|---|---|---|
| 1,512,745 | Carey | Oct. 21, 1924 |
| 1,518,608 | Short | Dec. 9, 1924 |
| 2,479,543 | Russell | Aug. 16, 1949 |